United States Patent [19]
Eakman et al.

[11] 3,742,217
[45] June 26, 1973

[54] NUCLEAR RADIATION GAUGE STANDARDIZING SYSTEM

[75] Inventors: Stephen L. Eakman, Framingham; David F. Wood, Acton, both of Mass.

[73] Assignee: LFE Corporation (formerly Laboratory for Electronics, Inc.), Waltham, Mass.

[22] Filed: Jan. 18, 1971

[21] Appl. No.: 107,257

Related U.S. Application Data

[63] Continuation-in-part of Ser. No. 790,649, Jan. 13, 1969, abandoned.

[52] U.S. Cl. ...... 250/83.3 R, 250/83 C, 250/83.3 D
[51] Int. Cl. ............................................. G01t 1/16
[58] Field of Search ................. 250/83 C, 83.3 D, 250/83.3 R, 210

[56] References Cited
UNITED STATES PATENTS

| | | |
|---|---|---|
| 3,348,046 | 10/1967 | Lloyd ............................ 250/83 C |
| 3,508,035 | 4/1970 | Worthley ................. 250/83.3 D X |
| 3,513,310 | 5/1970 | Chope et al. ................. 250/83.3 D |

*Primary Examiner*—Archie R. Borchelt
*Attorney*—Kenway, Jenney & Hildreth

[57] ABSTRACT

A nuclear radiation thickness gauging system including a radioactive source and an ion chamber connected through a switching arrangement to a preamplifier. The output signal from the preamplifier is a voltage signal having an amplitude representing the detector signal amplitude over the full range of operation. The system is arranged to produce two standardizing full amplitude signals, one for zero absorber conditions and one for maximum absorber conditions. The three signals are used in an output circuit to generate standardized measurement signals representing the thickness of a material being measured. The output circuit in one embodiment is a nulling measurement circuit which utilizes the standardizing signals to adjust the preamplifier characteristic and the system gain. In another embodiment the output circuit is a computer which standardizes the measurement signals mathematically.

12 Claims, 10 Drawing Figures

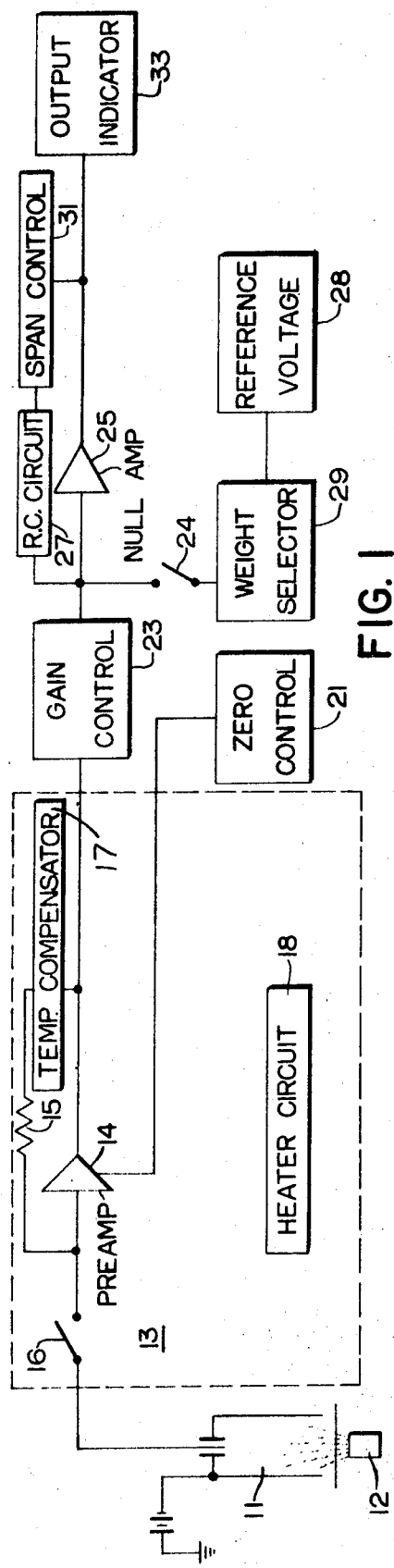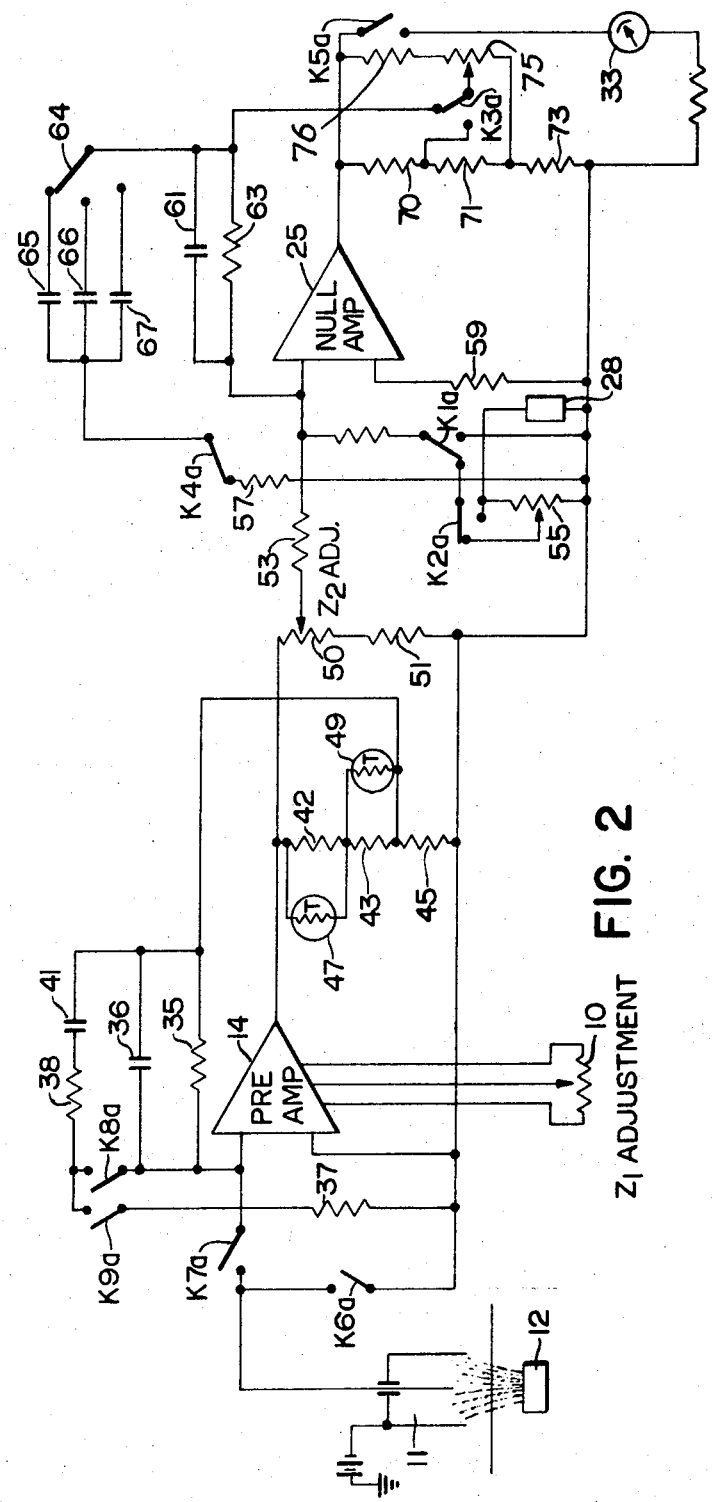

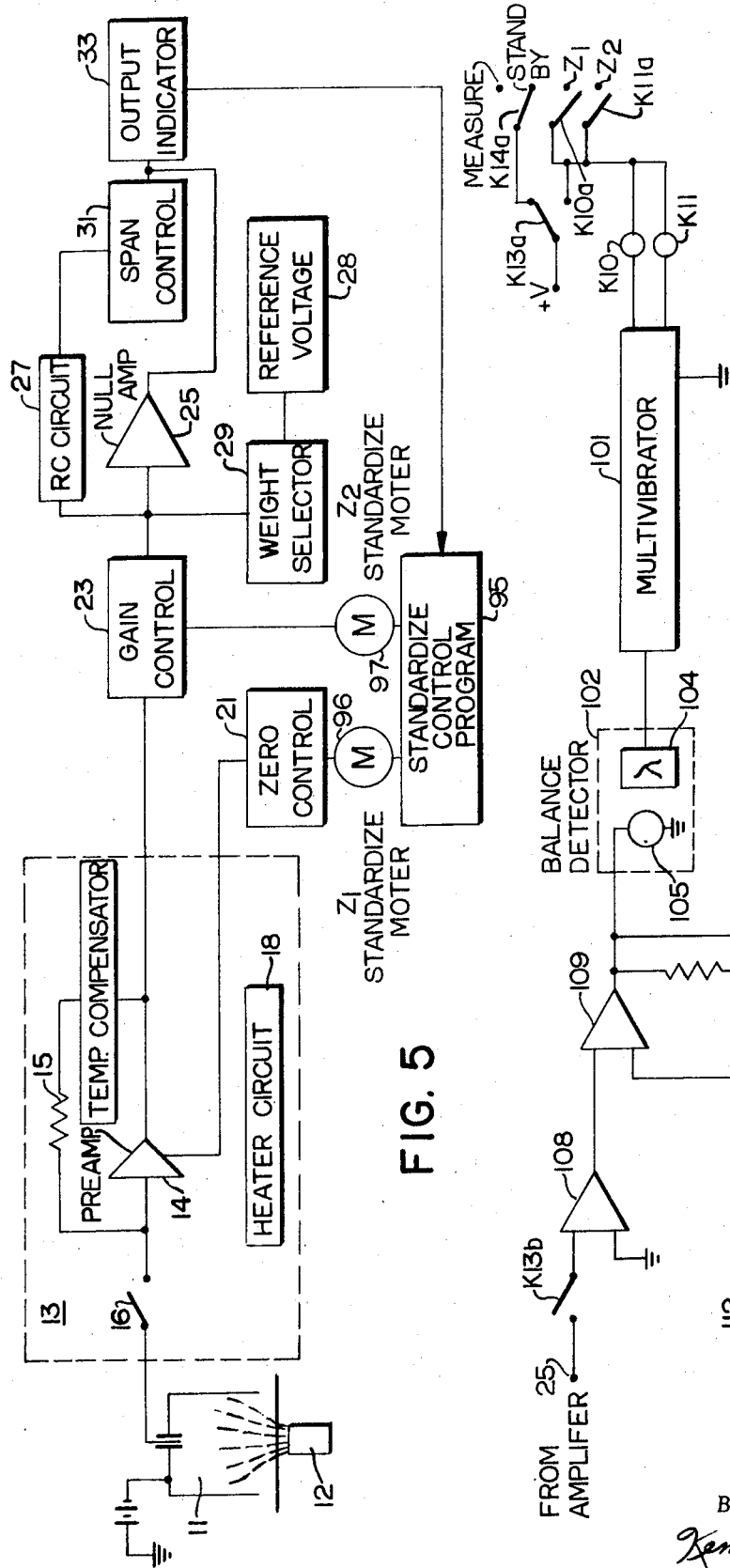
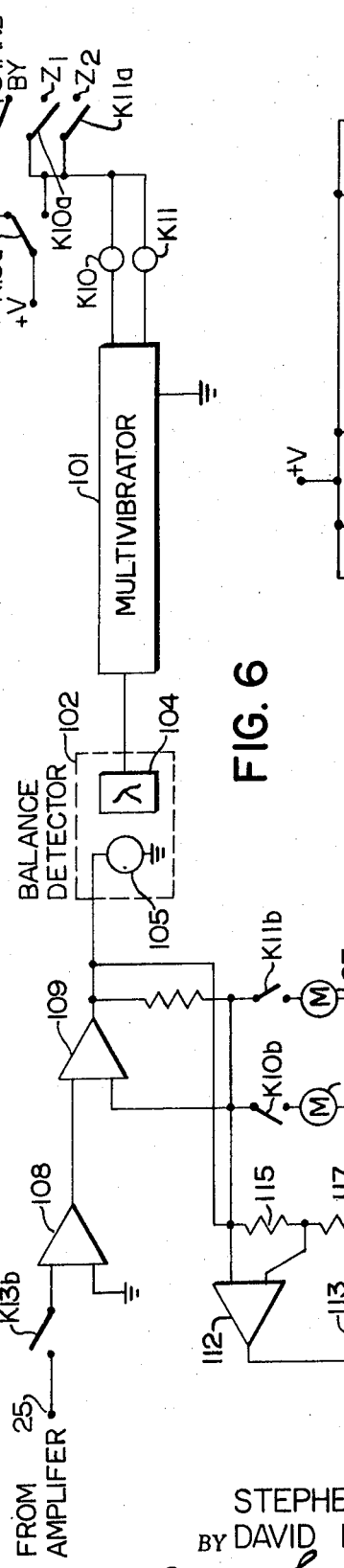
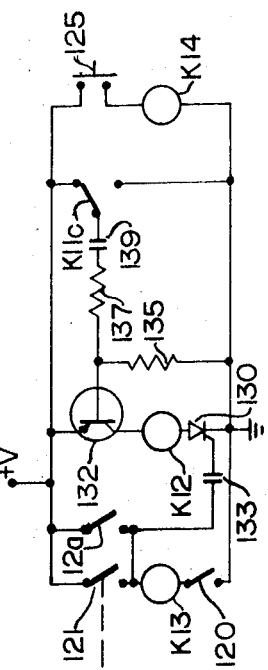
FIG. 5
FIG. 6
FIG. 7

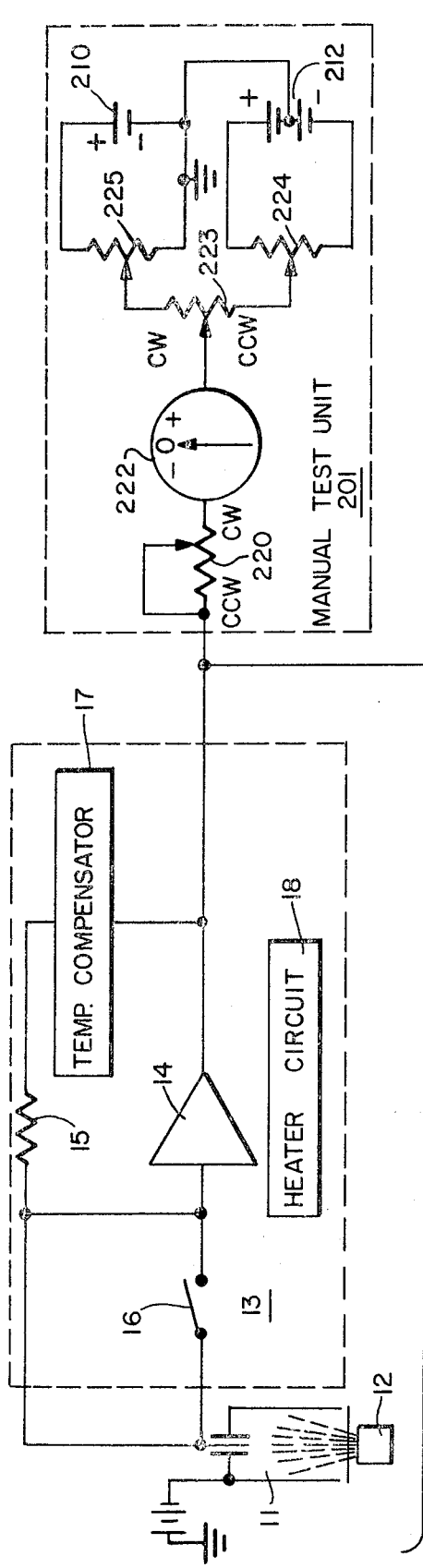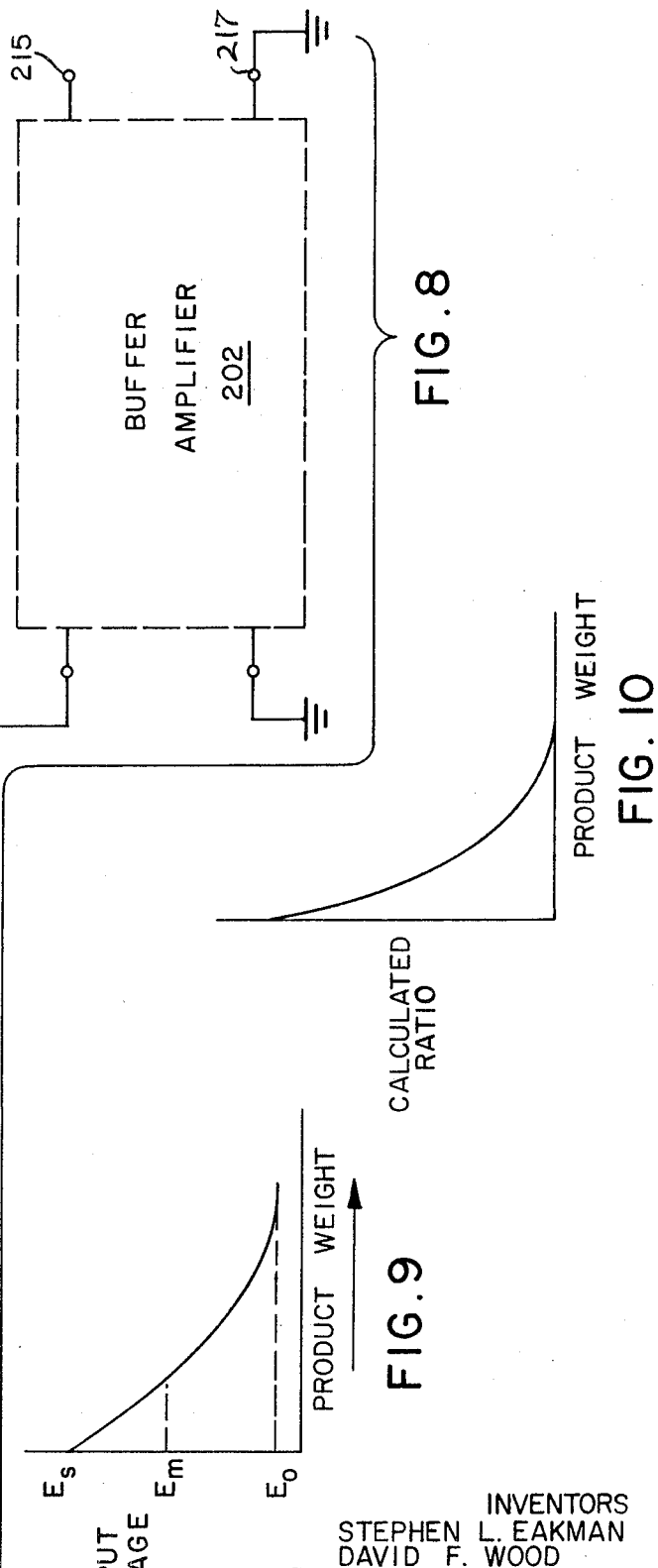
FIG. 8
FIG. 10
FIG. 9
INVENTORS
STEPHEN L. EAKMAN
DAVID F. WOOD
BY
Kenway, Jenney & Hildreth
ATTORNEYS

NUCLEAR RADIATION GAUGE STANDARDIZING SYSTEM

FIELD OF THE INVENTION

This application is a continuation in part of co-pending patent application Ser. No. 790,649 filed Jan. 13, 1969 entitled Nuclear Radiation Gauge Standardizing System, now abandoned.

This invention relates in general to nuclear radiation measuring gauges and more particularly to a radiation gauge including a standardizing system for maintaining precise calibrations of the radiation gauge under a variety of ambient conditions over long periods of time.

BACKGROUND OF THE INVENTION

Nuclear radiation gauge measuring systems are now well known in the art. In general these systems include a source of nuclear radiation, such as beta ray emitting source positioned to impinge rays upon a material whose thickness is to be measured, and a radiation detector for measuring radiation either transmitted through or reflected from the material and from producing electrical output signals indicative of the quantity of radiation detected. In most instances, this detector takes the form of an ionization chamber which produces relatively minute currents at very high impedances, typically in the order of $10^{13}$ ohms. The remainder of the gauge includes an amplifier for amplifying the small currents from the detector, a reference potential for determining the value of amplified current by a null balancing technique and some form of output meter or recorder. These radiation gauges are used for the on line measurement of materials in process, such as the fabrication of paper or plastic sheets.

As on line measuring control instruments, the thickness gauges must have high accuracy, for example, measuring a sheet of thickness .001 to ± .00001 inch. There are, however, a number of variables which can effect the accuracy of the measurement. These include variations in ambient environmental conditions as well as changes in the components of the system itself. In the former category there are variations in temperature, variations in the density of the air column between the source and detector, and the presence of particulate matter, such as dust, both in the air gap and on the window surfaces of the detector or source. Variations in the components may include variation in gain of the amplifier, changes in value of high impedance components with temperature, radioactive decay of the source over long periods of time, and variations in ionization chamber characteristics as a function of temperature changes.

In the past standardization systems have been devised to compensate for these environmental and component changes. In one such system the output current in the ionization chamber is applied across a high impedance resistor and the resulting voltage is placed in series with a variable opposing voltage to provide the input signal to an electrometer amplifier. The electrometer amplifier was designed to operate only at a very small range about a zero difference between these voltages and the output of this electrometer amplifier is applied to a servo amplifier with the latter controlling the value of the variable opposing voltage. The entire system forms a servo mechanical feedback loop maintaining the input voltage to the electrometer amplifier at a null value by varying the quantity of opposing voltage. The servo mechanism also operates an output recorder indicating the value of thickness. In order to maintain this gauge in calibration, a two step standardization is carried out periodically, typically every thirty minutes. The two steps compensate for different types of errors and effectively standardize the gauge at two different points at the extremeties of the measuring conditions. Thus "zero" standardization takes place with the input of the electrometer amplifier disengaged from the opposing voltage source and detector and involves an adjustment to the bias of the electrometer amplifier compensating for internal variations in zero drift in the system. Since there is zero difference signal applied to the amplifier, this condition corresponds to the full absorber point on a measurement curve, that is the maximum thickness of material and a minimum radiation signal.

The second standardization step, often referred to as "source" standardization, takes place with the source and detector in position as they would be during a measurement, however, with any material between the source and detector removed so that the detector is receiving the maximum amount of radiation, corresponding to a measurement position of zero thickness of material. In this standardization step the variable opposing voltage reference source is adjusted so that the maximum voltage from this source precisely equals the maximum voltage developed across the high impedance resistor under conditions of no absorber. This standardization step compensates for variations in source decay, source strength or detector response due to changes in the air column between the source and detector and for particulate matter on the windows of this source or detector. One problem with the type of thickness gauging system just described arises from the nature of the null balancing system, namely that no amplified signal (standardized for source decay) is available which varies in magnitude directly with the thickness of the material being measured. Such a signal is useful, for example, in providing a computer input from a gauge. Also in this system the speed of response of a gauge is inherently limited by the response time of the servo system.

Other complications arise from variable settings used in the gauge and the effect of the standardization steps on initial calibration. Two such settings are the span setting and the weight setting. The span setting is one which adjusts the full scale measurement for a specific range of thicknesses so that the maximum change in thickness expected will correspond to a full scale deflection of the recorder or meter. In many prior art systems changes in the settings on source standardization affected the span setting such that a specific signal output no longer corresponded to the same maximum change of thickness of material. The weight adjustment on a thickness gauge is a setting for the center scale or target thickness. Thus the opposing voltage is selected to provide an output signal in the center of the meter or recorder at a specific target weight, which is the expected mean weight of the material being measured. In a nulling system a measurement signal at this weight is exactly balanced by the opposing voltage and there is therefore a zero output signal. However, for thickness differing from this target weight deviation voltage signals will be produced. The span setting is one which converts these deviation signals into output signals representing specific thicknesses of material; since the usual detectors produce a signal which varies nonlinearly with thickness, changes in the weight setting require changes in the span setting. Again, variations in setting of the source standardizing adjustment could result in a variation of this span calibration.

In a more recent type of nuclear radiation gauge a solid state preamplifier is used in place of the electrometer amplifier and this amplifier provides a full scale signal at its output, which signal is compared to a reference voltage with the difference between them then applied as the input to a nulling type amplifier. The output of this nulling amplifier is used to drive an output indicator such as a meter or pen recorder. In this gauge only one standardizing step is provided and that is for the condition of maximum signal when no absorber is present. This standardization is carried out by varying the sensitivity at the output from the preamplifier. In this configuration, the temperature compensating element for changes in temperature of the chamber is not corrected proportionally. When standardization is adjusted another problem which arises with this circuit is the length of time required to calibrate. It is apparent that standardizing a gauge every thirty minutes with no material in the gap requires an interruption of the measurement operation for the period that the gauge is withdrawn from the material. In conventional gauges, however, a relatively long period of time is required in order to get precise calibration because the random statistics associated with a radioactive source require a relatively long time constant of measurement in order to obtain sufficient accuracy. Typically for this source standardizing step a time period in the order of 50 seconds is required.

SUMMARY OF THE INVENTION

Broadly speaking the radiation measuring gauge of this invention includes an input stage for generating an electric signal which varies with variation in the thickness of measured material and a second stage which generates an output signal indicative of the measured thickness. The input stage includes a radioactive source directing radiation onto a material to be measured, an ionization chamber as a radiation detector and circuitry connected to the ionization chamber to provide an output signal which is directly related to the variations in the quantity of radiation received by the chamber over the full range of operation and is therefore directly indicative of variations in the material being measured. This circuitry includes a direct current amplifier with a feedback circuit employing a high impedance resistor connected between its input and output and with the input connected through a switching arrangement to the ionization chamber. Temperature compensating elements in the feedback circuit provide compensation for temperature changes in the chamber and air gap.

In one embodiment the second stage consists of nulling and standardizing circuitry to provide, as an output, indication of thickness and to provide for automatic standardization to compensate for variations in the circuitry, gauge components and the environment. In another embodiment, the second stage includes a buffer amplifier unit, which also provides automatically for standardization conditions, and coupled to the output of this buffer amplifier, a computer. In this embodiment, there is no standardization of the circuitry, rather the signals generated during the standardization steps are provided to the computer and are utilized in the computer program to compensate the measurement signal mathematically for variation in circuitry conditions or environment. In both embodiments the temperature compensated signal developed at the output of the direct current amplifier is employed as the input to the second stage, whether it be the nulling circuitry or the buffer amplifier. There are also configurations of this second embodiment in which the output signal from the first stage is coupled to a nulling circuit as well as to a computer.

The measuring gauge includes several features for allowing a two step standardizing sequence, without affecting the sensitivity calibration of the gauge or the calibration for temperature compensation, without allowing charges to build up on the ionization chamber insulators and without unacceptably long time delays for purposes of standardizing. The basic circuitry is such that the first amplifier provides a full range output signal which, while not having a linear relationship to the measured characteristic of the material, does have a relationship which remains constant over the lifetime of the radioactive source so that a specific signal will correspond to a specific value of this characteristic. Since the gauge also includes provisions for establishing the condition of maximum absorber and of a lower reference value of absorber, this first amplifier output may be provided as a standardized full scale signal for use with an output circuit or alternatively as an uncorrected measurement signal following full scale signals representing both conditions, all three signals being supplied as inputs to a computer to generate a correct value of thickness.

The output of the first amplifier, which is a solid-state differential input amplifier, appears across a resistor network which includes two thermistors, one positioned to sense the temperature in the air gap between the detector and the radioactive source and the other positioned within the casing of the detector to sense the temperature of the ion chamber itself. Variation in temperature in these two locations is then compensated automatically by variations in the thermistor values and hence a compensating variation in the amount of the output signal which is fed back across the high impedance to the input.

In the nulling embodiment, a second resistive network is applied directly between the output from the first amplifier and the signal ground so that a source standardizing adjustment may be made in the amount of the signal which is passed from this network to the input of the nulling amplifier. In this embodiment, there is also connected to the input of the nulling amplifier a reference voltage which is selected to be approximately equal in magnitude and opposite in polarity to the signal from the first amplifier corresponding to the target value of the material being measured. The output of the nulling amplifier is coupled through the span sensitivity control to an output indicator such as a meter or recorder.

Both the solid-state preamplifier and the nulling amplifier have time constants associated with them. During measurement the time constant of the solid-state preamplifier is made short compared to that for the nulling amplifier with a selection of time constant being available for the nulling amplifier to establish the controlling time constant for the system. The nulling amplifier also includes a negative feedback loop and the feedback factor is adjustable and serves as a range or span control for the system.

The measuring system has a two-step standardizing procedure in which the system is first standardized for the operating condition corresponding to maximum absorber or zero signal and secondly is standardized for the condition of a minimum reference absorber or upper reference signal. The maximum absorber condition may be created directly by closing a shutter blocking radiation from the source so that it does not reach the radiation detector or indirectly by electrically disconnecting the detector from the input of the first amplifier. The reference absorber condition is obtained by allowing the radiation from the source to impinge directly on the detector without any intervening material to be measured.

The accuracy of this reference absorber standardization depends upon a precise measurement of the radiation from the nuclear radiation source. For most applications the nuclear source is formed of a radioactive isotope. Radioactive isotopes emit radiation at a rate which fluctuates randomly around a means value. Thus the accuracy of the measurement increases with the time over which the measurement is made. For high accuracy a relatively long time constant for determining the voltage across the high impedance resistor is desired. However, under normal conditions, six or seven time constants are required for an equilibrium voltage to be established and this unduly prolongs the time for standardization. A switching arrangement has been included in the present system for precharging with a short time constant a capacitor, prior to connecting it across the high impedance resistor for standardizing with a long time constant. For this arrangement an accuracy approximately equal to that obtainable under the long time constant conditions is obtained without the lengthy period required for reaching equilibrium.

Another feature of the present invention is the provision of a standby operating position, in which radiation is being measured so that the capacitors across both the first amplifier and the second amplifier remain charged to values corresponding to the quantity of radiation being received at the detector without any output display. Upon switching from the standby condition to the measuring condition, the delay, otherwise required, for buildup to equilibrium of the signal across these capacitors is eliminated.

In the nulling circuit arrangement, which includes a servo controlled standardization, the first standardizing step, referred to as "zero" or $Z_1$ standardization is accomplished by disconnecting the detector from the input of the first amplifier and adjusting a potentiometer to control the input bias of this amplifier with no input signal until the output display or indicator also has a zero reading. This is then an additive correction in which a zero reference signal is subtracted or added to subsequent measurement signals. For purposes of this adjustment, the reference voltage must also be disconnected from the input of the nulling amplifier. A switching arrangement is provided to connect the output from the ionization chamber to ground during this zero standardizing step in order to prevent buildup of charge on the insulators of the chamber. Thus the information as to the $Z_1$ output signal is effectively stored in this potentiometer, and subsequent signals produced by this amplifier directly correspond to the difference between the detector produced signal amplitude and zero signal amplitude.

The second standardizing step, referred to as "source" or $Z_2$ standardization is accomplished in the same embodiment, by varying the setting of the potentiometer in the output divider of the first amplifier and thereby adjusting the portion of the output signal from the first amplifier that is applied to the nulling amplifier. Subsequent output signals from this divider are then full scale voltage signals standardized for these $Z_2$ conditions. Since the adjustment is a multiplicative factor applied to the full scale signal all subsequent measurement signals are full scale standardized signals which may be compared directly to original calibration voltages to generate output signals directly representative of thicknesses of the material. The reference voltage applied to the input of the nulling amplifier is taken as the full reference voltage rather than a selected portion of the reference voltage. Under these circumstances the divider adjustment is made until the output indicator shows a zero signal for these $Z_2$ conditions.

With the circuit configuration of this invention, the $Z_2$ standardization for variation in dust and environmental conditions around the radioactive source and detector and for radioactive decay over the life of the radioactive source can be made independently of the temperature compensation calibration and is independent of the range setting. As above described, the time constant switching arrangements are such that accuracy associated with long time constants can be achieved with a time required for standardization typical for a short time constant. As part of the initial calibration of the system the weight potentiometer which selects the reference voltages is calibrated in terms of the thickness or weight of the material to be measured. This calibration thereafter holds for the operating life of the gauge, independent of the standardizing adjustments. Since the standardization takes place for both an upper reference signal and a minimum signal, the gauge is standardized periodically at both ends of the response curve.

In one arrangement, an automatic standardizing system is provided which is arranged to withdraw the detector and source from the material to be measured, periodically, for example, every thirty minutes, and to initiate and carry out the two steps standardizing sequence automatically. At the conclusion of the standardization the gauge is returned to measuring the material. In the case of particular gauge configurations it may be more convenient to remove the material being measured from the gap than to withdraw the detector and source from the material.

BRIEF DESCRIPTION OF THE DRAWINGS

In the drawings:

FIG. 1 is an illustration in block diagrammatic form of one embodiment of a nuclear radiation measuring system in accordance with the principles of this invention;

FIG. 2 is an illustration in schematic form of one embodiment of a nuclear radiation measuring system in accordance with the principles of this invention;

FIG. 5 is an illustration in block diagrammatic form of an automatic standardizing measuring system in accordance with the principles of this invention;

FIG. 6 is an illustration partially in block diagrammatic and partially in schematic form of a control and programming circuit useful in the system illustrated in FIG. 5;

FIG. 7 is an illustration in schematic form of a timing control circuit used in conjunction with the programming control circuit of FIG. 6;

FIG. 8 is an illustration partially in block diagrammatic form and partially in schematic form of a second embodiment of a measuring system in accordance with the principles of this invention;

FIG. 9 is an illustration in graphical form of a response curve of the system of FIG. 8; and FIG. 10 is an illustration in graphical form of ratio as product weight curve helpful to an understanding of this invention.

DESCRIPTION OF PREFERRED EMBODIMENTS

Figure 3:
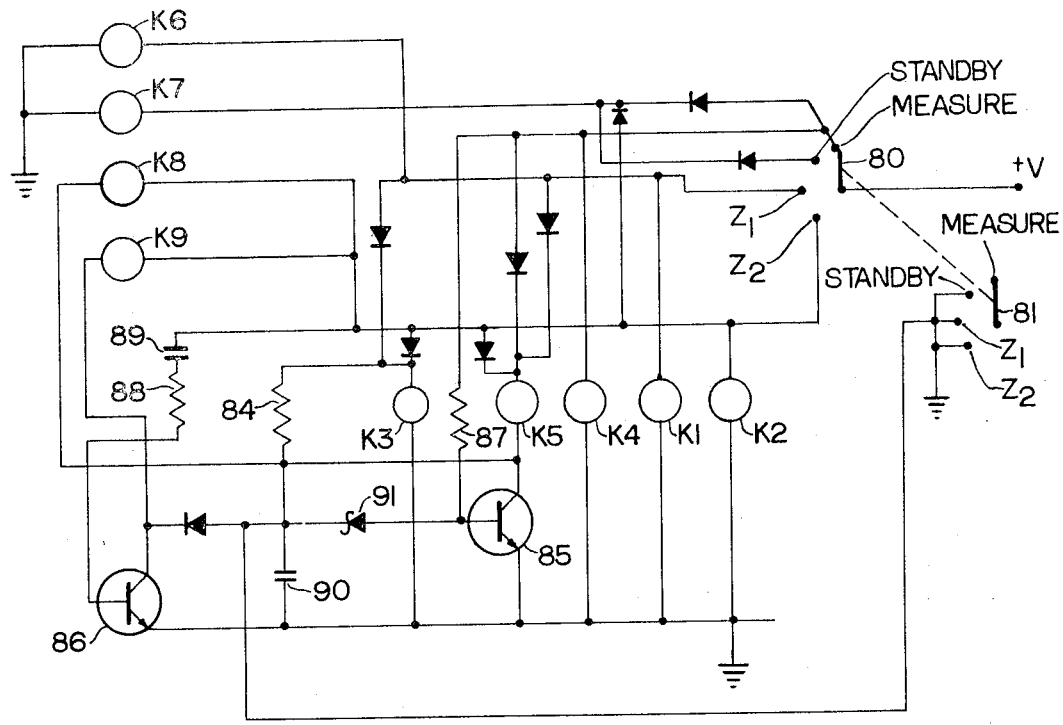
FIG. 3 is an illustration in schematic form of a switching control circuit suitable for use in the system of FIG. 2.

With reference now to FIG. 1, a manual standardizing radiation gauge is shown in block diagrammatic form. A source of nuclear radiation 12 such as a radioactive beta emitting material, is positioned to emit radiation onto a material 10 to be measured. An X-ray source may also be used and the term nuclear radiation as used herein is intended to include X-rays. Radiation transmitted through the material 10 is detected at the ion chamber 11. The output from the chamber 11 is connected through switch 16 to the input of the preamplifier unit 14. A feedback resistor 15 of very high impedance, typically $10^9$ ohms, is connected across the preamplifier 14 and the current through this impedance produces a voltage signal indicative of the value of the current signal from the chamber 11. A temperature compensation circuit 17 is included in the feedback path from the preamplifier 14 and employs thermistor elements positioned both to determine the variation in temperature of the chamber 11 and of the air gap between the chamber 11 and the source 12. A zero control unit 21 is connected to preamplifier 14 and may be adjusted to vary its input level. The temperature compensation circuit 17, high impedance resistor 15, and preamplifier 14 are all enclosed within a housing generally designated 13 together with a heater circuit 18. The purpose of the heater circuit is to maintain the high impedance resistor 15 at a constant temperature to avoid variations in output signal arising from variations in the value of this resistor with temperature.

The output from the amplifier 14 is coupled through gain control unit 23 to the input of nulling amplifier 25. Also applied to the input of nulling amplifier 25 is a voltage signal from the reference voltage 28, the value of this voltage signal being controlled by adjustment of the weight selection unit 29. The output of the null amplifier 25 is fed back through an RC circuit 27 to its input and this output is also applied through span control unit 31 to an output indicator 33.

In measurement, the switch 16 is closed and material 10 is inserted between the detector 11 and the source 12. The current to the preamplifier and therefore the voltage signal at the output of the preamplifier varies with variations in the thickness of the material. As part of an initial calibration, the weight selection unit 29 is adjusted to precisely match the voltage signal applied to the input of amplifier 25 for a specific "target" value of the thickness of material 10. The nulling amplifier develops sufficient output signal to maintain its input at a substantially zero value and the output from the nulling amplifier 25 is therefore directly indicative of the difference between the voltage signal from the weight selection unit 29 and the voltage signal from gain control 23. This output signal is applied to the output indicator 33. The span control unit 31 is a range control which permits adjustment of the feedback factor for the feedback circuit around amplifier 25. By changing the setting of the span control 31, the total amount of signal applied to the output indicator 33 may be adjusted to correspond to varying ranges of thickness. The output indicator 33 may take any of several conventional forms, such as a voltage meter, current meter or a pen recorder.

The gauge system illustrated in FIG. 1 is intended to be standardized periodically by adjustment of both the zero control and the gain control in a specific sequence. For the initial "zero," or $Z_1$ standardization, the switch 16 is opened thereby disconnecting the chamber from the input of the preamplifier 14. Simultaneously switch 24 connecting the voltage signal from the weight selection unit 29 is opened so that output indicator 33 indicates only the value of a signal developed internally within the amplifiers. Under this condition of no input signal, the system has initially been calibrated so that the output indicator should provide a zero reading and the zero control unit 21 is now adjusted until this condition again obtains. Thus the zero end of the system response is recalibrated for use in the next measurement cycle. The adjustment to the preamplifier 14 will depend upon the precise amplifier configuration. In one embodiment, a solid-state amplifier with a differential input stage has been employed. In such an amplifier this adjustment takes the form of varying the balance between the difference stages at the input. In another amplifier this adjustment might, for example, vary the internal bias of the first stage. While conventional DC amplifiers have been described, any amplifying system which performs the function of receiving on its input a DC signal and providing an amplified DC signal on its output is included. Thus a parametric amplifier or a combination of a vibrating reed, an AC amplifier and a demodulator could be employed. The term DC amplifier as used herein is intended to encompass all such systems. While switch 16 disconnects the detector and amplifier, other means of providing a zero input signal may be employed such as a shorting switch across the resistor 15.

After the completion of the $Z_1$ standardization, the gauge is standardized for conditions of full signal, called "source" or $Z_2$ standardization. In this step the switch 16 is closed and the material 10 is removed from the gap between the source 12 and the detector 11. The weight selection unit 29 is adjusted to provide for the full value of the reference voltage to be supplied through switch 24 to the input of the nulling amplifier 25. The gain control 23 is then adjusted so that the portion of the signal developed in preamplifier 14 which is provided to the input of nulling amplifier 25 precisely equals the reference voltage supplied through switch 24. While the reference signal here is a voltage, it will be understood that alternatively a reference current signal may be used. In the step then the system is recalibrated to the initial calibration value for the maximum signal on the response curve.

The switching arrangements and circuit configurations suitable for accomplishing these standardizations are shown in more detail in FIG. 2. Referring to FIG. 2, like numbers refer to like parts of FIG. 1. In FIG. 2 the switching elements with a K designation are intended to represent relay contacts. The switching contacts of FIG. 2 are shown in the position they occupy when the corresponding relay coil is deenergized. The output from the chamber 11 is connected through contacts K7a to one input terminal of the preamplifier 14, the other input terminal being grounded. The preamplifier 14 may take the form of a solid-state amplifier with a differential input. A potentiometer 40 connected to the preamplifier 14 serves as a $Z_1$ adjustment element and, in an amplifier with a differential input stage, varies the balance between the pair of elements in this input stage.

A second switch K6a is connected between the output lead from chamber 11 and ground. Preamplifier 14 has its output terminal connected to ground through a series of three resistors 42, 43 and 45. In parallel with resistor 42 is thermistor 47 which may be located in position to sense the temperature variations in the air gap between the source 12 and the chamber 11. A second thermistor 49 is connected in parallel with resistor 43 and this thermistor 49 is positioned to sense the variations in temperature in the chamber 11 itself. A very high impedance resistor 35, (for example, $10^9$ ohms) is connected between one of the input terminals of preamplifier 14 and the intersection between resistors 43 and 45 and this resistor 35 provides the basic feedback path. Connected in parallel with resistor 35 may be a capacitor 36 to filter high frequency noise and to control overshoot in the amplifier. In this position it also controls the time constant of the amplifier during measurement. With another amplifier design, this time constant might be established only by the stray capacitance of the circuit. An additional network may be coupled into the feedback path by means of switch K9a and this additional network includes the series combination of capacitor 41 and resistor 38 as well as resistor 37. A set of relay contacts K8a, when closed, connects the serial combination of resistor 38 and capacitor 41 across capacitor 36. As will be explained in more detail below, these additional elements, which may be inserted in the feedback path, serve the purpose of precharging the capacitor 36 during the standardization cycle.

The output from preamplifier 14 also appears across a voltage divider network formed of potentiometer 50 and resistor 51. The arm of potentiometer 50 is coupled through resistor 53 to one input terminal of nulling amplifier 25 and varying the position of the arm on potentiometer 50 provides for the $Z_2$ adjustment in source standardization. The reference voltage source 28 is connected between ground and one side of potentiometer 55 with the center arm of potentiometer 55 connected through relay contacts K2a and K1a to one end of resistor 58, the other end of which is connected to the input terminal of the nulling amplifier 25. The other input terminal of the nulling amplifier 25 is connected through resistor 59 to the circuit ground.

The output of the nulling amplifier 25 appears between the output terminal and ground across a series combination of resistors 70, 71 and 73. A feedback path around this amplifier 25 is formed by the parallel combination of capacitor 61 and resistor 63 and this feedback path may be connected through relay contacts K3a either to the intersection between resistors 70 and 71 or to the adjustable arm of potentiometer 75 which is connected in series with resistor 76 between the output terminal of amplifier 25 and the intersection between resistors 71 and 73. The time constant of the feedback loop around amplifier 25 may be varied by inserting any one of three capacitors 65, 66 and 67 in parallel with capacitor 61 through relay contacts K4a. The selection of which of these capacitors is to be placed in parallel is made by operation of the selector switch 64. In a standby condition, the selected capacitor is connected to ground through series resistor 57 which permits it to charge rapidly. An output meter 33 is connected through the relay contact K5a in series with resistor 75 between the circuit ground and output terminal of amplifier 25 and serves as an output display for the system.

Figure 4:
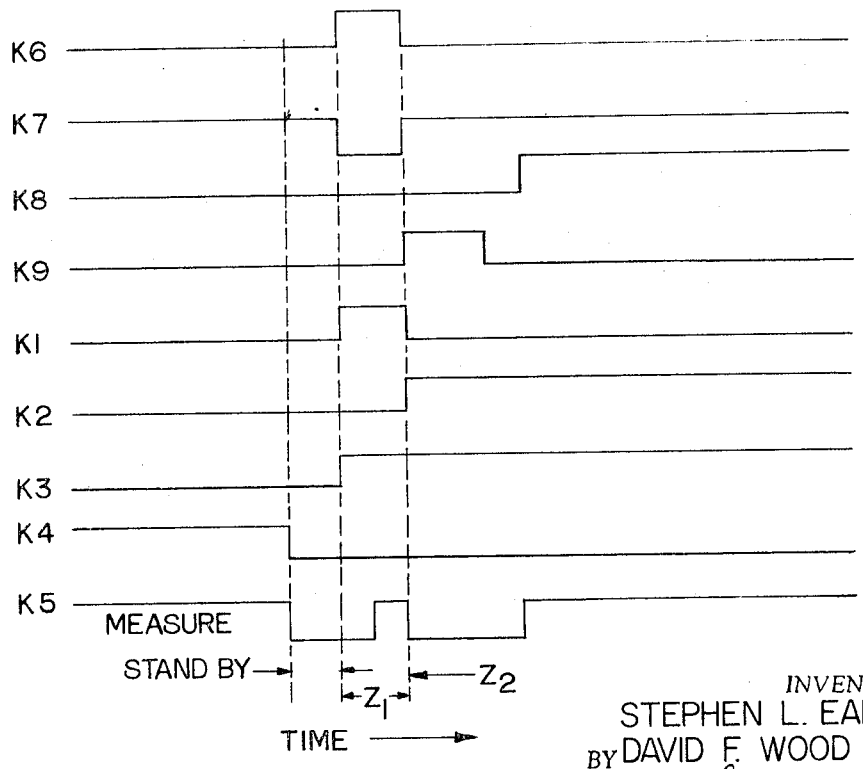
FIG. 4 is an illustration in graphical form of the time pattern of operation of the switches illustrated in FIG. 3.

In FIG. 3 there is illustrated a control circuit for operating the relay contacts included in the circuit of FIG. 2. FIG. 4 is a time chart of operation of the relay coils in this control circuit. The circuit of FIG. 2 can be switched into four different configurations to perform the four different functions of the circuit. These functions are, the measuring function for measuring the thickness of the material 10 in the gap, the standby function which maintains the gauge in a ready position for measuring, but in which the output meter 33 is disconnected from the gauge, and the $Z_1$ and $Z_2$ standardizing functions. In the control circuit of FIG. 3 a two deck function switch containing decks 80 and 81 may be manually operated to select the appropriate function of the circuit. Switch 80 connects a voltage supply indicated as +V to any one of four contacts, each contact representing one of the functions of the circuit as indicated. The control circuit includes the operating coils for each of the relays K1 through K9 and additionally contains isolating diodes and two time delay circuits for controlling the operation of the relay coil K5 in the $Z_1$ standardizing step and for relays K5, K8 and K9 during $Z_2$ standardization.

The time delay circuit for the operation of the relay K5 in $Z_1$ standardization delays energization of K5 for one second after the $Z_1$ standardize position is selected on switch 80. This delay circuit consists of transistor 85, resistor 84, capacitor 90 and Zener diode 91. The second delay circuit is arranged to control the period of energization of K9 and to delay the energization of K5 and K8 in standardization. This second delay circuit consists of transistor 86, capacitor 89 and resistor 88. The precise manner in which these circuits operate to delay the energization of relay K5 will be explained in detail below.

When the control circuit is switched into the measuring condition the energizing voltage is supplied to relay coil K7, relay coil K5 and relay coil K4. Relay coils K7 and K4 have one side directly connected to ground and hence are immediately energized by the application of the voltage to the other side. Relay K5 is connected to ground through transistor 85, which is normally not conducting and hence the energization of relay K5 requires a signal to be applied to the base of transistor 85. During measurement, this signal is applied directly through resistor 87 and hence K5 is energized without any significant delay. The switching deck 81 includes a switching arm which momentarily shorts adjacent contacts when switching from one to the other. When in position on one contact it is not, however, contacting any other point. In the measuring condition this switch is connected to an otherwise unconnected contact point.

With relays K4, K5 and K7 energized, the circuit of FIG. 2 has the respective contacts K7a, K4a and K5a in their closed positions. In this situation, the signal from the ionization chamber 11 is amplified by preamplifier 14 with a time constant established by the resistor 35 and capacitor 36 for the first amplifying stage and the output signal from the arm of potentiometer 50 is applied directly to one input of null amplifier 25, to which is also applied, from weight potentiometer 55, a selected portion of the reference voltage generated by voltage source 28. This weight potentiometer 55 is adjusted to provide a zero output signal when the target weight is being measured. The time constant of the second amplifier 25 is controlled by the parallel combination of capacitor 61 and the particular one of the capacitors 65, 66 and 67 which has been selected by operation of the switches 64. Typically the values of time constant are such that the capacitors 65, 66 and 67 might represent respective time constants of .5 seconds, 1.5 seconds and 5.0 seconds. The basic time constant formed of resistor 63 and capacitor 61 would normally have a value of approximately 0.1 seconds. In the initial calibration, span control 75 was adjusted to provide for full range output for the expected range of thicknesses to be measured and the output is read on the meter 33 through the closed contacts of switch K5a.

If function switch 80 on the control circuit of FIG. 3 is switched into the standby position, relay coil K7 remains energized, but relay coils K4 and K5 become de-energized. Under this circumstance the output meter 33 is disconnected from the circuit and therefore is not indicative of the measured value. The switch contacts K4a now connect the selected time constant capacitor in the bank 65, 66 and 67 through resistor 57 to the circuit ground. The switch K4a here performs the function of precharging the time constant capacitor through a short time constant such that when the circuit is switched from standby to measure, the overall gauge may switch instantly from the standby condition to the measuring condition without an extensive intermediate period. For example, if the five second time constant were selected by operation of switch 64 the circuit would normally come to equilibrium, when switching from standby to measurement, in about 16 seconds. With the present precharging circuit configuration, as controlled by the relay contacts K4a, this time is reduced to the nominal amount of meter or pen recorder time constant, typically .5 seconds. In the standby condition the time constant of the nulling amplifier is established, for example, by the value of capacitor 67, and resistor 57, which could be about .1 seconds.

In order to standardize, the gauge must first be standardized in the $Z_1$ position and then at the $Z_2$ position. When the function switch 80 is switched into the $Z_1$ standardize position from standby, the mechanically connected arm switch 81 is also switched from the standby position to the $Z_1$ standardizing position. In making this transition the $Z_1$ contact is momentarily shorted to ground through the action of the switch arm 81 thereby shorting out capacitor 90 and gating off transistor 85. On switch deck 80, the selection of the $Z_1$ standardize position connects the positive voltage across relay coils K1, K3, K6 and K5. Since the transistor 85 is initially cut off, the relay K5 is not energized until after the capacitor has charged through resistor 84 to a value sufficient to render the transistor 85 conducting. The component values are selected so that this time delay is approximately one second.

In the $Z_1$ standardizing condition relay contacts K7a are opened and the relay contacts K6a are closed. Therefore the chamber signal is not connected to preamplifier 14 and the collector of the chamber is connected directly to ground instead. The significance of the contacts K6a are that they allow the charge collected on the collector of ionization chamber 11 during this $Z_1$ standardization to bleed off, thereby avoiding the charging of the insulators. Should this charge be allowed to buildup a redistribution would be required before appropriate source standardizing or measurement could take place and the time required for this redistribution would seriously extend the standardization period. The energization of relay $K_1$ disconnects the reference voltage source from the input to null amplifier 25 and therefore allows the output of amplifier 25 to represent only a signal transmitted from preamplifier 14. The delay in closing of contacts K5A provides that, during the switching, no transients will be indicated on meter 33 and therefore there can be no $Z_1$ adjustment until after the signal transients have disappeared. The energization of relay coil K3 switches contacts K3a so that the feedback connection of the nulling amplifier is taken from a fixed point and is independent of the span setting. With the system in the $Z_1$ condition, potentiometer 40 is adjusted until the output meter indicates a zero output signal which is the proper state when there is no input signal being applied from the chamber 11. As earlier indicated, this $Z_1$ adjustment could take the form of adjusting either the bias of an input stage or, where the input stage is a differential input, the balance of this circuit.

After the $Z_1$ adjustment has been completed, the function switch is switched into the $Z_2$ standardize position. In this position, the positive voltage is connected across the relay coils K2, K3, K5, K7, K8 and K9. Relay coils K2, K3, and K7 have the other side connected directly to ground and hence are instantaneously energized. The function switch in deck 81 in moving from $Z_1$ standardize position to $Z_2$ standardize position shorts out capacitor 90 and hence transistor 85 is nonconducting. Thus, initially, coil K5 is not energized. Coil K8 has its other side connected also through transistor 85 and thus cannot be energized until K5 is energized. Coil K9 is connected through transistor 86 to ground. This transistor is rendered conducting by the voltage from +V and coil K9 is therefore energized initially and remains energized until capacitor 89 charges through resistor 88 to the point where transistor 86 is rendered non-conducting. The component values of resistor 88 and capacitor 89 are selected such that this time constant is approximately four seconds. At the conclusion of this latter time constant coil K9 is deenergized.

During the period when transistor 86 is conducting it effectively shorts out capacitor 90 thereby preventing coils K5 and K8 from being energized. When capacitor 89 has charged to a value such that the transistor 86 is biased into the cutof condition, capacitor 90 recharges through resistor 84 and, as in the $Z_1$ standardizing cycle, the charging time constant is one second. Therefore one second after K9 has become deenergized relay coils K5 and K8 become energized.

Turning to the circuit of FIG. 2, the energization of the coils in the control circuit establishes the conditions and sequencing of the conditions for source standardization. Initially contacts K7a are closed and contacts K6a are open so that the output of the chamber 11 is connected to the preamplifier 14. The material 10 to be measured is withdrawn so that the radiation from the radiation source 12 is directly incident upon the chamber 11. The contacts K9a are closed and the contacts K8a are open so that the output of preamplifier 14 charges capacitor 41 through the series combination of resistors 37 and 38. Typical values for these components are 22 megohms for resistor 37, 10 megohms for resistor 38 and .005 microfarads for capacitor 41. This results in a charging time constant for capacitor 41 of .16 seconds. During this initial period of the $Z_2$ standardization contacts K5a are opened and thus there is no output appearing on meter 33. The energization of relay contacts K2a connects the maximum voltage across potentiometer 55 through resistor 58 to the input terminal of nulling amplifier 25 and the energization of relay K3 switches the contacts K3a from the span potentiometer 75 to a fixed point on the resistor network at the output of the amplifier 25, thus eliminating the span adjustment as a factor in the source standardizing step.

After the four second delay the K9a contacts open and, one second later, the K8a contacts close as do the K5a contacts. The closure of contacts K8a places the charged capacitor 41 in parallel with capacitor 36 across resistor 35. Capacitor 36 is much smaller than capacitor 41 and the controlling time constant is therefore the product of capacitor 41 and resistor 35. Since capacitor 41 is already charged to a potential corresponding to the signal from the chamber 11 for uninterrupted radiation from source 12, there is no long time required to reach equilibrium. The algebraic sum of the output signal across preamplifier 14 and the total voltage available from potentiometer 55 appears at the input of null amplifier 25 and the output signal from null amplifier 25 is displayed on meter 33. The $Z_2$ adjustment potentiometer 50 can now be adjusted until the fraction of the voltage appearing across the output of preamplifier 14 just equals the total reference voltage available from potentiometer 55. This matching is indicated by a zero reading at meter 33.

The precharging of capacitor 41 with a rapid time constant and the subsequent switching of this charged capacitor into the time constant circuit allows a large value of capacitance to be used for capacitor 41 and this provides the long time constant accuracy, typically .1 percent of maximum signal, required for source standardizing, without having to wait the six or seven time constants normally required for the long time constant capacitor to charge to equilibrium. In a typical example, the precharging circuit enables the charging of the $Z_2$ circuit to be reduced from approximately 35 seconds to approximately 8 seconds.

In FIG. 5 there is illustrated in block diagrammatic form an automatic standardizing nuclear radiation gauging system. In this system the two step standardization is carried out automatically in a predetermined sequence and at specific timed intervals. In FIG. 5 like numbers have been used to designate like parts as shown in FIG. 1. In addition to the basic circuit elements illustrated in FIG. 1, the automatic system of FIG. 5 includes a standardize control and program unit 95 which has a signal provided to it from the output indicator 33 and a $Z_1$ standardize motor 96 which is energized by the standardize control and program unit 95 and which operates the adjustment on the zero control unit 21. A $Z_2$ standardize motor 97 is also controlled by the standardize control and program unit 95, to adjust the gain control unit 23.

In FIG. 6 and FIG. 7 the elements of the control and program units which provide for the automatic operation are shown. With reference to FIG. 6, it will be understood that the contacts designated, measure, standby, $Z_1$ and $Z_2$ correspond precisely to the like contacts of the control circuit of FIG. 3 and that the system includes the control circuit of FIG. 3. In this automatic system, however, the function switching is carried out automatically by operation of relay coils K10, K11, K12, K13 and K14. In FIG. 6 the relay switching contacts are shown in the position they occupy during measure, that is with each of the coils deenergized.

FIG. 7 shows the timing elements of the automatic standardizing sequence. A timer 120, which may typically be a synchronous motor with a cam attached, is positioned to close switch 121 every 30 minutes, thereby initiating a standardizing cycle. The closure of switch 121 allows capacitor 133 to charge and the silicon controlled rectifier 130 becomes conducting thereby energizing coil K12 through transistor 132. The energization of coil K12 closes contacts K12a and also operates an off sheet motor (not shown) which provides for withdrawal of the chamber 11 and the source 12 from the sheet material being measured and, when these elements are withdrawn from the sheet, maintaining their relative position to one another, they close the contacts on microswitch 120. Under these conditions positive voltage is applied through contacts K12a and switch 120 across relay coil K13. Contacts 12a, therefore, serve to latch the relay coil K13 in the on position. Through contacts K13a the energization of relay K13 switches the positive voltage from the arm of relay contacts K14a to the arm of relay contacts K11a. In addition the energization of this relay closes relay contacts K13b thereby providing a path from the output of amplifier 25 to the driving amplifier circuit which includes amplifiers 108 and 109. These amplifiers serve to respond to the output signal from amplifier 25 and drive either the $Z_1$ standardizing motor 96 or the $Z_2$ standardizing motor 97, depending upon the position of relay contacts K10b and K11b.

The switching of contacts K13a also produces a positive voltage signal on one side of relay coils K10 and K11, the other side of these coils being connected to ground trrough multivibrator 101. During the measurement sequence the multivibrator 101 is in a condition where it connects one side of K10 to ground. Upon energization of K10 the multivibrator starts a timing period which will terminate after K10 has been energized for ten seconds. At the conclusion of this ten second period the multivibrator switches into a state where K11 is connected to ground for a period of approximately 20 seconds.

The energization of relay K10 connects positive voltage to the contact $Z_1$ of the function switch thereby energizing the coils K6, K1, K3 and deenergizing coil K7 to provide for zero standardizing. As in the case of the manual gauge, relay K5 is actuated after a one second delay. Since the contacts K13b are closed, then any signal during zero standardization at the output of amplifier 25 will result in driving the $Z_1$ motor 96 which adjusts the zero adjustment until there is no longer an output signal.

At the conclusion of the ten second period, as timed out by multivibrator 101, the K10 coil is deenergized and the coil K11 is energized. The energization of coil K11 switches the contacts K11a so that the function switch is connected to $Z_2$ standardizing position and the circuit of FIG. 3 is now connected, for source standardizing. Energization of coil K11 also switches the contacts K11c which connects one side of the charged capacitor 139 to ground. In the source standardizing step, the relay contacts K11b connect the output of the driving amplifier 109 across the $Z_2$ standardizing motor 97. Any signal from the output of amplifier 25 will, therefore, result in the $Z_2$ standardizing motor 97 operating the $Z_2$ adjustment until this output is reduced to zero, to source standardize the gauge. When the multivibrator 101 times out the 20 second period allowed for source standardizing, it deenergizes relay K11 which results in transistor 132 being turned off, thereby deenergizing relay coil K12, unlatching the relay coil K13. If the timing cam is formed so that switch 21 remains closed for a period less than this 30 seconds, the timing out of multivibrator 101 deenergizes K13 returning the function switch to either the standby or measure position. Whether the gauge is in the standby or measuring condition is controlled by the state of relay K14. This relay is energized by push button 125 which, when so energized, provides for measurement.

Two other special features are included in the automatic standardizing gauge. These features are a balance circuit which provides for extending the multivibrator period if the standardization has not been completed in the normal timing out sequence and a stall alarm to provide for setting off an alarm 113 whenever the current from the output of the amplifier 109 becomes excessive, corresponding to a signal being generated which is unabled to be compensated for by adjustment of $Z_1$ or $Z_2$. The balance detector includes a lamp 105 which, when energized by the output of amplifier 109, shines light on a photodetector 104. The photodetector 104 provides a current signal to multivibrator 101 when it is receiving light from the lamp 105. The presence of this signal prevents the multivibrator from changing state. Thus, if at the conclusion of a normal ten second or twenty second timing out period there is still an output signal from amplifier 109 indicating that balance has not been achieved for that standardizing step, the action of the balancing detector will maintain the multivibrator in that step and maintain the energized one of the relay coils K10 and K11 in the energized condition until the output from 109 has been reduced to zero or until an alarm has been provided from the stall alarm circuit formed by resistors 115, 117 and amplifier 112.

In FIG. 8 there is illustrated a measuring gauge system in which the input stage is substantially identical to the input stage for the embodiment illustrated in FIG. 1 and in which like numbers refer to like components. But the output stage in this embodiment includes a buffer amplifier for coupling the input stage to a computer. The system of FIG. 8 also includes a manual test unit for establishing the initial calibration conditions of the measuring gauge. As will be described in more detail below, the standardization procedure, after the initial calibration, consists in generating a zero standardizing signal and a source standardizing signal for application to the computer. The computer is programmed to calculate the thickness of the material being measured from the measurement signal it receives directly in combination with the last previous source standardizing and zero standardizing signals.

In the system illustrated in FIG. 8, the output signal from the preamplifier 14 is coupled to one input terminal of buffer amplifier 202. The other input terminal of this amplifier is grounded. The amplifier includes a pair of output terminals 215 and 217, with terminal 217 also being grounded. The amplifier may take any of several conventional forms, the particular design being selected to match the input characteristics of the computer being used to the gauge circuitry.

The output signal from preamplifier 14 is also provided to a manual test unit 201, which is used for the initial calibration of the system. This signal from preamplifier 14 is connected through span potentiometer 220 to a meter 222. The other side of the meter 222 is connected to the movable arm of weight potentiometer 223. Weight potentiometer 223 is equipped with a dial indicating the position of the arm on this potentiometer. The clockwise (cw) end of potentiometer 223 is connected to the movable arm of standardization potentiometer 225 and the counterclockwise (ccw) end of potentiometer 223 is connected to the movable arm of standardization potentiometer 224. Potentiometer 225 is connected across voltage source 210 which has its negative terminal connected to ground and potentiometer 224 is connected across a two cell voltage source 212 which has its center connected to ground.

In this system, the basic concept is to provide measurement signals to a computer and also to provide the standardizing signals to a computer to compensate for any variations in environmental conditions or in circuit conditions that occur during the course of the measurement. Provided that the variations stay within the operational limits of the system, no standardization in the sense of adjustments to the amplifiers or potentiometers during the course of operation need be made. In this approach the thickness or weight of the material is determined by calculating in the computer a ratio relating the measured signal from the unknown thickness of material to the standardization signals obtained for maximum absorber conditions and reference absorber conditions during the previous two-step standardization. This ratio is then compared to stored information relating the ratio to product thickness or weight.

In FIG. 9 there is illustrated a plot of product weight versus output voltage from the preamplifier 14. The upper reference signal $E_s$ occurs at a zero product weight thickness, corresponding to the source standardizing condition and the voltage decreases until it reaches the value $E_o$ corresponding to the maximum absorber or zero standardizing condition. The individual product thickness will produce measurement signals $E_m$ lying on the curve between these two values. The basic relationship which is used to determine the product thickness is the ratio $$R = [E_m \text{ (zero corrected)}/E_s \text{ (zero corrected)}].$$

In the computer this ratio is expressed as $$R = (E_m - E_0)/(E_s - E_0),$$

where $E_m - E_0$ is the measurement signal after zero correction and $E_s - E_0$ is the source standardizing signal after zero correction. Thus in the computer the zero correction is an additive one and the source standardizing signal is used as a multiplicative factor on the full scale measurement signal to maintain that signal in its initial calibration. A plot of product weight versus R, as illustrated in FIG. 10, can be constructed by measuring a series of known samples and plotting the ratio for each sample. This initial calibration curve will then be valid for all products of the same material and changes in the zero standardizing voltage, $E_0$, and the source standardizing voltage, $E_s$, will only effect the calculation of the ratio from the measured signal, that is, these changes result in a shift of the response curve, as illustrated in FIG. 9, while the ratio curve of FIG. 10 still remains valid.

The manner in which the gauge system is initially calibrated for operation with the computer is as follows. Initially the zero standardization for the manual test unit is done. This is accomplished by opening switch 16 and adjusting zero potentiometer 224 until the deviation meter 222 reads zero. Potentiometer 223 must be set at the counterclockwise (ccw) end. Potentiometer 220 may be set at the closewise (cw) end for best meter sensitivity. The source standardization is then carried out with no material to be measured interposed between the source 12 and the detector 11 and with switch 16 closed so that the maximum signal is obtained. The source standardization potentiometer 225 is now adjusted until the meter needle is at zero. Potentiometer 223 must be set at the clockwise (cw) end.

The standardization potentiometers 224 and 225 are then used to establish the calibration of potentiometer 223 so that the dial setting indicating the position of the arm of potentiometer 223 represents the same ratio, R, as shown in FIG. 10. This calibration is achieved by finding the ratio for a number of samples covering the desired range. The first sample is inserted between source 12 and detector 11, adjusting potentiometer 223 until meter 222 reads zero and then reading the dial which indicates the position of the arm on 223. This process is repeated for each calibration sample.

The preamplifier 14 output voltage is available at the output of the buffer amplifier 202 at terminal 215. The output signals required by the computer are $E_m$, $E_s$ and $E_0$. $E_s$ and $E_0$ are stored in the computer during standardization of the gauge. Thus, when the material to be measured is inserted between the source and detector, the measured value of $E_m$ can be used by the computer to calculate the ratio R. The relationship between the ratio R and product weight has previously been entered into the computer either in the form of a mathematical expression or in the form of tabulated values.

Periodically thereafter, for example, every thirty minutes, the computer or a separate program control (not shown) may call for zero and source standardization. At each zero standardization a new value of $E_0$ is produced at the output terminal 215 from the buffer amplifier 202 and at each source standardizing step a new value for $E_s$ is supplied. These new values replace the initial values entered into the computer and thus each calculation of R is made with reference to the most recent values obtained for conditions of maximum and minimum absorber. During zero standardization switch 16 is opened to establish $E_0$. A logic signal is provided from the program control to the computer to cause the computer to sample and store the signal at point 215 as $E_0$. During source standardization switch 16 is closed and the maximum signal is obtained with no material to be measured interposed between the source 12 and the detector 11. A second logic signal from the program control causes the computer to sample and store the signal at point 215 as $E_s$.

It should be noted that for both the embodiment including the nulling amplifier and the embodiment including the computer, the input stage is the same. Thus, as a practical matter, the same unit including source and detector preamplifiers and carriages for moving the source and detector to and away from a process line can be employed, preserving the option of either using a mulling amplifier and servo standardization system or a computer readout. This is provided, in part, since the output of the preamplifier is a thermally compensated full range voltage signal which is directly related in amplitude to the thickness of the material being measured. In both embodiments the standardization signals derived from zero standardization and source standardization are used in the same mathematical manner as references in the next measurements. Thus in the computer approach, these signals are stored in the computer and used to calculate the ratio for the following measured signals. In the mulling amplifier approach the signals are also stored in the form of potentiometer settings controlling the bias of the preamplifier and the gain between the first amplifier and the second. Since the output from the input stage includes in time sequence a full scale zero standardization signal, a full scale source standardizing signal and a full scale measurement signal, this output may be used in any system which applies the zero correction signal first and then applies the source standardizing signal as a multiplicative factor to generate a standardized full scale measurement signal for comparison to precalibrated voltages representing specific thicknesses of material. While a nulling measurement and standardization circuit and a programmed computer have been disclosed as preferred embodiments, other circuits which will provide there same types of standardization response and convert the full scale non-linear detector signals into thickness indication signals might also be employed.

We claim:

1. A radiation gauging system for measuring the thickness of a material over a specified range of operation comprising, a radiation source directing radiation onto said material to be measured, a radiation detector positioned to receive radiation from said source transmitted by said material and provide an output electrical signal related to the quantity of radiation received, a first amplifying means, means for connecting the output of said detector to the input of said first amplifying means to provide at the output of said first amplifying means a signal having a voltage magnitude directly related to the value of the output of the electrical signal from said detector over the full range of operation, an output circuit providing an output signal indicating variations in the measured thickness of said material, means connecting said output signal from said first amplifying means to said output circuit, zero standardizing means providing, upon actuation, a zero reference input signal to said first amplifying means and simultaneously from said first amplifying means a zero standardizing output signal representing a maximum thickness of said material to be measured, source standardizing means for providing upon actuation an upper reference value input signal to said first amplifying means when said detector is receiving radiation directly from said source and for simultaneously providing from said first amplifying means a source standardizing signal having a voltage magnitude representing a zero thickness of material to be measured, means for periodically actuating said zero standardizing means and said source standardizing means to provide said output circuit with said standardizing signals, and means included in said output circuit for storing said standardizing signals and employing said zero standardizing signal to zero correct succeeding measurement signals and to zero correct said source standardizing signal and employing said zero corrected source standardizing signal as a multiplicative correction factor on the zero corrected measurement signals in succeeding measurements of the thickness, for generating in said succeeding measurements output signals indicating the thickness of the material.

2. A radiation gauging system for measuring the thickness of a material over a specified range of operation comprising, a source of radiation directing radiation onto said material to be measured, a radiation detector positioned to receive radiation from said source transmitted by said material and provide an output electrical signal related to the quantity of radiation received, a first amplifying means, means for connecting the output of said detector to the input of said first amplifying means to provide at the output of said first amplifying means a signal having a voltage magnitude directly related to the value of the output electrical signal from said detector over the full range of operation, an output circuit providing an output signal indicating directly variations in the measured thickness of said material, means connecting the output signal from said first amplifying means to said output circuit, zero standardizing means providing, upon actuation, a zero reference input signal to said first amplifying means and simultaneously from said first amplifying means a zero standardizing signal representing a maximum thickness of said material to be measured, source standardizing means for providing upon actuation an upper reference value input signal to said first amplifying means when said detector is receiving radiation directly from said source and for simultaneously providing from said first amplifying means a source standardizing signal having a voltage magnitude representing a zero thickness of material to be measured, and means for periodically actuating said zero standardizing means and said source standardizing means to provide said output circuit with said standardizing signals, said output circuit including a computer which utilizes each of said signals to determine for succeeding measurements of thickness the output signal for indicating thickness of the material.

3. A radiation gauging system in accordance with claim 2 wherein said computer subtracts said zero standardizing signal from succeeding measurement signals to generate a zero corrected measurement signal and subtracts said zero standardizing signal from said source standardizing signal to generate a zero corrected source standardizing signal, multiplying said zero corrected measurement signals by a factor equal to one over said zero corrected source standardizing signal.

4. A radiation gauging system for measuring the thickness of a material over a specified range of operation comprising, a source of nuclear radiation directing radiation onto said material to be measured, a radiation detector positioned to receive radiation from said source transmitted by said material and provide an output electrical signal related to the quantity of radiation received, a first amplifying means, means for connecting the output of said detector to the input of said first amplifying means to provide at the output of said first amplifying means a signal having a voltage magnitude directly related to the value of the output of the electrical signal from said detector over the full range of operation, an output circuit providing an output signal indicating directly variations in the measured thickness of said material, zero standardizing means providing, upon actuation, a zero reference input signal to said first amplifying means and simultaneously from said first amplifying means a zero standardizing signal representing a maximum thickness of said material to be measured, source standardizing means for providing upon actuation an upper reference value input signal to said first amplifying means when said detector is receiving radiation directly from said source and for simultaneously providing from said first amplifying means a source standardizing signal having a voltage magnitude representing a zero thickness of material to be measured, and means for periodically actuating said zero standardizing means and said source standardizing means to provide said standardizing signals, said output circuit including a nulling amplifier and a reference signal source, and wherein said connecting means connecting the output of said first amplifying means and said output circuit includes a two position switching means for connecting in a first position only the output from said first amplifying means to the input of said nulling amplifier and in a second position the combination of the output from said first amplifying means and a signal from said reference source to the input of said nulling amplifier, a first adjusting means responsive to said zero standardizing signal for adjusting the input characteristics of said first amplifying means with said two-position switching means in said first position, such that for said zero standardizing signal said output circuit provides a zero output, a second adjusting means for adjusting the effective gain between said first amplifying means and said output circuit in response to said source standardizing signal.

5. A radiation gauging system for determining the thickness of a material to be measured comprising,
a source of radiation directing radiation onto said material to be measured,
a radiation detector positioned to receive radiation from said source transmitted by said material to provide an output electrical signal related to the quantity of radiation received,
a first amplifying means,
said first amplifying means including an amplifier with a feedback loop from its output to its input, said feedback loop including a high impedance resistor, and a temperature compensation circuit comprising,
first and second thermally responsive elements whose resistive value varies with changes in temperature, at least one of said thermally sensitive elements being positioned to sense the ambient temperature of said detector,
means for connecting the output of said detector to the input of said first amplifying means to provide at the output of said first amplifying means a signal having a magnitude directly related to the value of the output electrical signal from said detector,
first switching means for providing a zero input signal to said first amplifying means,
a second amplifying means,
a reference signal source,
a second two-position switching means for connecting in a first position only the output from said first amplifying means to the input of said second amplifying means and in a second position the combination of the output from said first amplifying means and a signal from said reference source to the input of said second amplifying means,
an output indicator for providing an output indication of the magnitude of the signal at the output of said second amplifying means,
first adjusting means for adjusting the input characteristics of said first amplifying means such that when the first switching means had provided a zero input signal to said first amplifying means and said second two-position switching means has removed said reference signal from said second amplifying means, the output signal from said second amplifying means may be reduced to substantially zero signal level by adjusting the first adjusting means,
a means providing for a source standardizing signal to be generated with no material to be measured,
a second adjusting means for adjusting the effective gain between said first amplifying means and said second amplifying means, in response to said source standardizing signal.

6. A radiation system in accordance with claim 5 wherein said reference signal source has included therein an adjustable element for selecting a specific fraction of said reference signal corresponding to the value of the signal of the first amplifier means produced with a specific material to be measured interposed between said radiation source and said detector and including a third switching means operable when said second adjusting means is being adjusted to connect the total reference signal from said signal reference source to said second amplifying means and operable during measurement to connect said specific fraction to the input of said second amplifying means.

7. A radiation gauging system in accordance with claim 5 wherein said second amplifying means had a feedback loop including an adjustable resistive element, whereby the amount of the output signal from said second amplifying means which is fed back to the input of said second amplifying means may be adjusted to set the range of said system.

8. A radiation gauging system comprising,
a source of nuclear radiation directing radiation onto a material to be measured,
a radiation detector positioned to receive radiation from said source transmitted by said material to provide an output electrical signal related to the quantity of radiation received,
a first amplifying means and
said first amplifying means including an amplifier with a feedback loop from its output to its input, said feedback loop including a high impedance resistor,
means for connecting the output of said detector to the input of said first amplifying means to provide at the output of said first amplifying means a signal having a magnitude directly related to the value of the output electrical signal from said detector,
first switching means for providing a zero input signal to said first amplifying means,
a second amplifying means,
a reference signal source,
a second two position switching means for connecting in a first position only the output from said first amplifying means to the input of said second amplifying means and in a second position the combination of the output from said first amplifying means and a signal from said reference source to the input of said second amplifying means,
an output indicator for providing an output indication of the magnitude of the signal at the output of said second amplifying means,
first adjusting means for adjusting the input characteristics of said first amplifying means such that when the first switching means had provided a zero input signal to said first amplifying means and said second switching means has removed said reference signal from said second amplifying means, the output signal from said second amplifying means may be reduced to substantially zero signal level by adjusting the first adjusting means, and
a second adjusting means for adjusting the effective gain between said first amplifying means and said second amplifying means,
a first capacitor, one terminal of said first capacitor being coupled to the output side of said high impedance resistor, and
fifth and sixth switching means coupled to the free end of said first capacitor, said fifth switching means, when actuated, coupling the free end of said capacitor to the other side of said impedance resistor and said sixth switching means, when actuated, coupling the free end of said first capacitor through a low impedance path to a point of potential reference, said fifth and sixth switching means being interrelated such that said sixth switching means is actuated only after said fifth switching means has been actuated for a sufficient time to charge said first capacitor to a substantially equilibrated value.

9. A nuclear radiation gauging system comprising, a source of nuclear radiation directing radiation onto a material to be measured, a radiation detector positioned to receive radiation from said source emitted from said material to provide an output electrical signal related to the quantity of radiation received, a first amplifying means and, a first adjusting element for adjusting the input characteristics of said first amplifying means, and first switching means for connecting the output of said detector to the input of said first amplifying means, said first amplifying means including an amplifier with a feedback loop from its output to its input, said feedback loop including a high impedance resistor and a first capacitor, one terminal of said first capacitor being coupled to the output side of said high impedance resistor, a pre-charging switching circuit connected to the free end of said first capacitor for coupling the free end of said first capacitor selectively to either the input of said first amplifying means or through a low impedance path to a point of potential reference, a second amplifying means, means connecting the output of said first amplifying means and the input of said second amplifying means, said connecting means including a second adjusting element for adjusting the portion of the output from said first amplifying means that is applied to the input of said second amplifying means, a reference voltage source, means for selectively connecting or disconnecting a signal from said reference voltage source to the input of said second amplifying means, an output indicator for providing an output indication of the magnitude of the signal at the output of said second amplifying means, means for connecting or disconnecting the output from said second amplifying means to said output indicator, control means for controlling the operation of said first switching means, said pre-charging switching circuit, said means for connecting a signal from said reference voltage source to the input of said second amplifier and said means for connecting the output of said second amplifier to said output indicator, in a predetermined sequence such that for adjustment of said first adjusting element, said first switching means had disconnected the output of said detector from said first amplifying means, the signal from said reference voltage source is disconnected from the input of said second amplifier, and the output of said second amplifier is connected to said output indicator and such that, for adjustment of said second adjusting element, the output of said detector is connected to the input of said first amplifying means, a signal from said reference voltage source is connected to the input of said second amplifying means and the output of said second amplifying means is initially disconnected from said output indicator while said pre-charging switching circuit couples the free end of said first capacitor to said point of potential reference for a time sufficient to charge said first capacitor to substantially full value, and thereafter said precharging switching means couples the free end of said first capacitor to the input of said first amplifying means while the output of said second amplifying means is connected to said output indicator for adjusting the second adjusting element.

10. A nuclear radiation gauging system in accordance with claim 9 and including a first adjustment motor, a second adjustment motor and automatic control means for automatically initiating and controlling a standardizing sequence so that said gauging means is first operated for adjustment of said first adjusting element by coupling said first adjusting motor from the output of said second amplifying means to vary the position of said first adjusting element until there is substantially no output signal from said second amplifying means and thereafter to couple said second adjusting motor to the output of said second amplifying means, said second adjusting motor being coupled to said second adjusting element to vary the position of that element until the output of said second amplifying means is substantially zero.

11. A nuclear radiation gauging system in accordance with claim 10 and further including a stall detector for providing an output alarm signal whenever either said first or said second adjusting motor cannot, when operating, vary the position of its respective adjusting element sufficiently to produce a zero output signal from the output of said second amplifier.

12. A nuclear radiation gauging system in accordance with claim 11 wherein a specific time period is allotted for adjusting said first element and a specific time period is allotted for adjusting said second element, and further including a balancing detector for extending either said first allotted time period or said second allotted time period if the output of said second amplifier has not been reduced to zero.

* * * * *